United States Patent [19]

Mutter

[11] Patent Number: 4,719,684

[45] Date of Patent: Jan. 19, 1988

[54] APPARATUS FOR INSERTING SEALS INTO INTERNAL GROOVES OF VALVE BORES

[75] Inventor: Harry P. Mutter, Media, Pa.

[73] Assignee: The Boeing Company, Seattle, Wash.

[21] Appl. No.: 913,448

[22] Filed: Sep. 30, 1986

[51] Int. Cl.⁴ ............................................. B23P 19/02
[52] U.S. Cl. .................................... 29/235; 29/33 K; 29/157.1 R; 29/282; 29/451
[58] Field of Search ............... 29/33 K, 235, 280, 282, 29/283, 450, 451, 157.1

[56] References Cited

U.S. PATENT DOCUMENTS

| 3,180,015 | 4/1965 | Thompson et al. | 29/235 |
| 3,289,286 | 12/1966 | Belanger | 29/235 |
| 3,406,441 | 10/1968 | Larsson | 29/235 |
| 3,455,011 | 7/1969 | Harding | 29/235 |
| 3,553,817 | 1/1971 | Lallak | 29/235 |
| 3,639,972 | 2/1972 | Schelin et al. | 29/235 X |
| 4,141,129 | 2/1979 | Martini | 29/235 |

FOREIGN PATENT DOCUMENTS

| 548639 | 4/1932 | Fed. Rep. of Germany | 29/235 |
| 1196200 | 12/1985 | U.S.S.R. | 29/235 |

Primary Examiner—P. W. Echols
Assistant Examiner—Ronald S. Wallace
Attorney, Agent, or Firm—Jones, Tullar & Cooper

[57] ABSTRACT

The apparatus is for manually inserting an O-ring in a selected annular groove of a bored valve body. A valve body is placed with one end of the body's bore over a plug. A thin walled tube is placed in the other end of the bore so a gap exists between the plug and tube, adjacent the selected annular groove. Two ends of a probe are then used to urge the O-ring through the tube, passing other blocked annular grooves or air passages in the valve body, toward and into the selected annular groove. Plugs and tubes of different lengths are used to insert O-rings in annular grooves at different positions in the bore.

8 Claims, 5 Drawing Figures

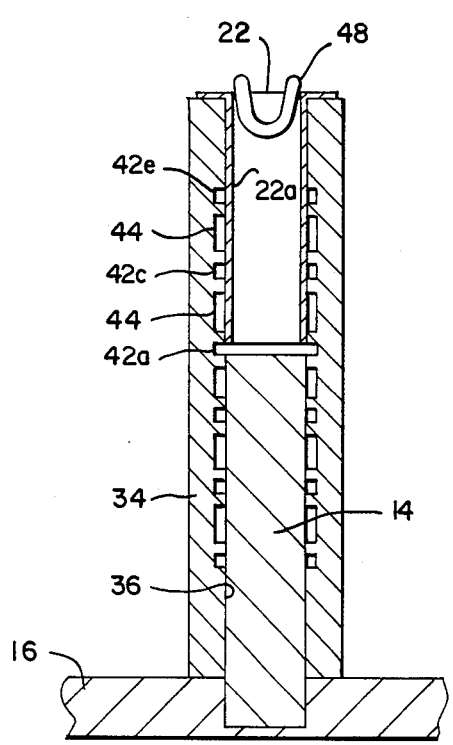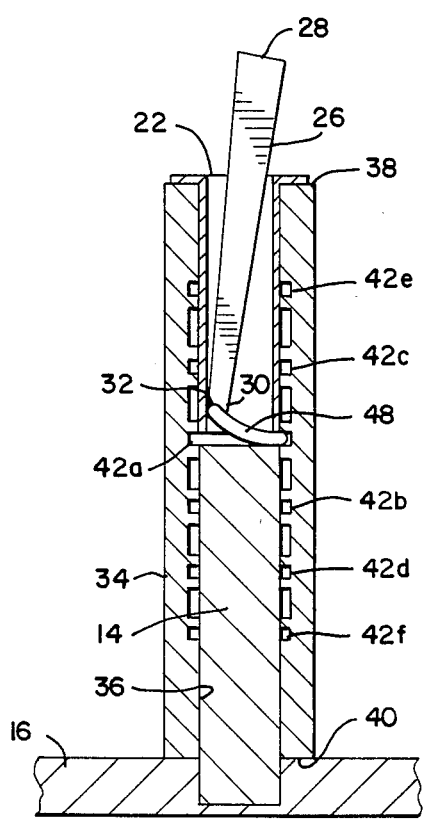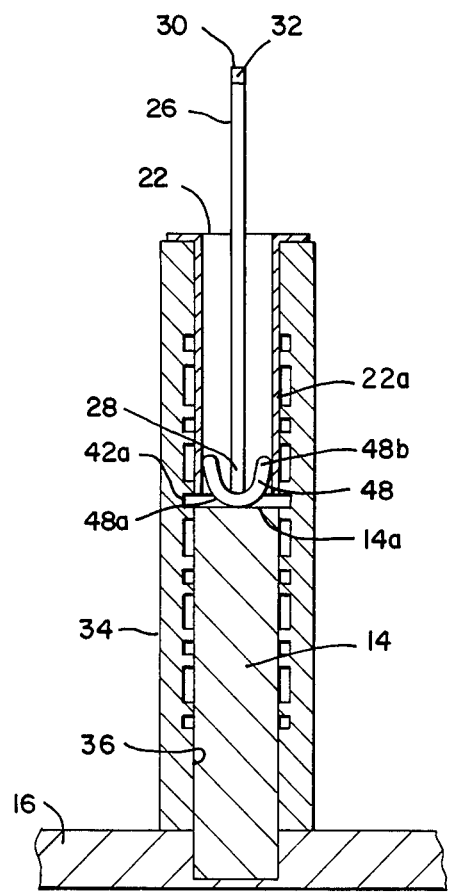

APPARATUS FOR INSERTING SEALS INTO INTERNAL GROOVES OF VALVE BORES

FIELD OF THE INVENTION

The invention relates to a manually operated seal insertion apparatus. More specifically, the invention relates to an apparatus for the manual insertion of O-rings into internal grooves of bores in valve bodies.

BACKGROUND OF THE INVENTION

Pneumatic valve bodies often have bores with internal grooves in which O-rings are inserted. Movement of pneumatic valve stems in the bores of the valve bodies causes wear and damage to the O-rings which must be replaced periodically. Various types of devices have been proposed for replacing O-rings.

U.S. Pat. No. 4,141,129 to Martini describes an O-ring insertion tool with a barrel and a mandrel that forms an opening through which an O-ring is ejected. The O-ring is inserted at a depth that depends on the length of the mandrel. An operator of this tool cannot see the position of the O-ring while the tool is used. It has been found that insertion of an O-ring at an angle described by this patent causes the O-ring to twist and jam inside the valve bore.

U.S. Pat. No. 3,639,972 to Schelin et al. involves a valve structure with a sleeve that slides in a bore. O-rings are seated in grooves in the exterior of the sleeve which is placed inside a tube. The tube, containing the sleeve, is inserted into the bore and then removed. However, the sleeve remains in the bore, with its external O-rings in place.

U.S. Pat. No. 3,553,817 to Lallak concerns a tool for installing seals, with a grooved mandrel in a sleeve. A seal is placed on the grooved mandrel, and the sleeve is moved over the seal. The tool is then inserted into a bore and the sleeve is withdrawn against substantial resistance of the seal. The seal is only partially released from the mandrel. Thus the seal is easily dislodged from a groove when the mandrel is removed from the bore. This tool prevents the operator from determining when the seal is adjacent a particular groove within a bore.

U.S. Pat. No. 3,455,011 to Harding describes a pliers type of tool for inserting O-rings into recesses of bores. This tool has a pin jaw that deforms an O-ring against a horseshoe jaw. The tool is inserted into a bore where the O-ring is installed into a groove of the bore by opening the jaws. However, the jaws are prevented from opening completely by the bore, which keeps the O-ring slightly deformed. Thus, when the tool is removed from the bore, the jaws tend to dislodge the ring from its position in a groove.

U.S. Pat. No. 3,289,286 to Belanger deals with an O-ring seating tool. This tool is used to insert an O-ring into a surface annulus formed by a counterbore. A sleeve rolls the O-ring over a tube extending from the annulus. The sleeve also seats the O-ring in the annulus.

U.S. Pat. No. 3,180,015 to Thompson et al. mentions a tool for inserting O-rings into annular sockets. Two slide members hold an O-ring for insertion into a bore. The slide members are surrounded by a sleeve. The sleeve can be a variety of lengths to insert an O-ring at a desired depth within the bore. A handle moves the slides within the sleeve to hold and release the O-ring. A user of this tool cannot see whether the O-ring is aligned with the socket or is jammed, when attempting to insert the O-ring.

Thus a need exists for a seal insertion apparatus that, during insertion; prevents jamming of the seal in a body bore, allows a view of the seal during insertion; and provides a guide for the seal to a particular annular groove.

SUMMARY OF THE INVENTION

The invention concerns an apparatus for inserting a seal into an annular groove in a bore that extends through a body. According to one version of the invention, the apparatus includes structure for supporting the seal, which is positionable into the bore toward the annular groove from one end of the body. The apparatus also includes structure for urging the seal through the bore toward the structure for supporting the seal, from an opposite end of the body. According to another version of the invention, the apparatus further includes structure for guiding the seal past an annular recess in the bore, for insertion of the seal in the annular groove.

An object of the invention is to provide an apparatus that aligns a seal with a selected annular groove in a bore of a body, for reception within the groove.

Another object is to provide a seal insertion apparatus that allows the user to view the seal during insertion.

An additional object is to provide a seal insertion apparatus that holds the bored body during insertions of the seal.

BRIEF DESCRIPTION OF THE FIGURES

FIGS. 3 through 5 show a sequence for the insertion of an O-ring into a valve body.

DETAILED DESCRIPTION OF THE INVENTION

Figure 1:
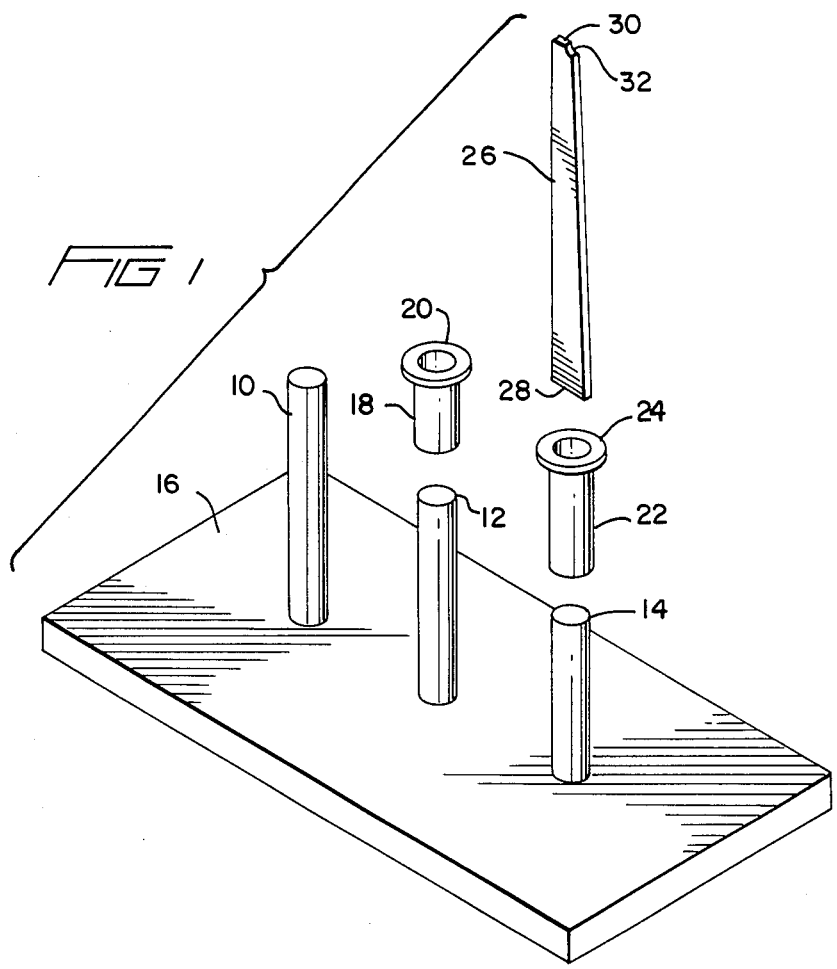
FIG. 1 shows an apparatus for inserting seals into internal, annular grooves of bored bodies, for instance.

FIG. 1 shows an apparatus for inserting seals, such as O-rings, into bored valve bodies, for instance. Three plugs 10, 12, and 14 are attached to a base 16. The three plugs 10, 12, and 14 have different lengths to place O-rings into different locations in a bore of the valve body, as discussed below. In a preferred version, these plugs are solid for strength, but can be hollow, closed cylinders. A thin walled tube 18 is hollow and open at its ends. A flange 20 is connected to one end of the tube 18. The tube 18 is paired with the plug 12 when inserting O-rings in a bored body. Another, longer, thin walled tube 22 has a flange 24 connected to one end. The tube 22 is longer than the tube 18, in an amount equal to the difference in length between the plugs 12 and 14. The tube 22 is paired with the plug 14. The plugs 10, 12, and 14 and the two tubes 18 and 22 have equal outer diameters. These diameters are equal so that the plugs 10, 12, and 14, and the tubes 18 and 22 fit the same valve body. A probe 26 is generally flat and tapered in its preferred form. Ends 28 and 30 of the probe 26 are used in urging an O-ring into position in a valve body, as discussed concerning FIGS. 2 through 5. The end 28 is dimensioned to fit closely inside the hollow tubes 18 and 22, and is substantially wider than an opposite end 30 of the probe 26. The end 30 has a notch 32.

Figure 2:
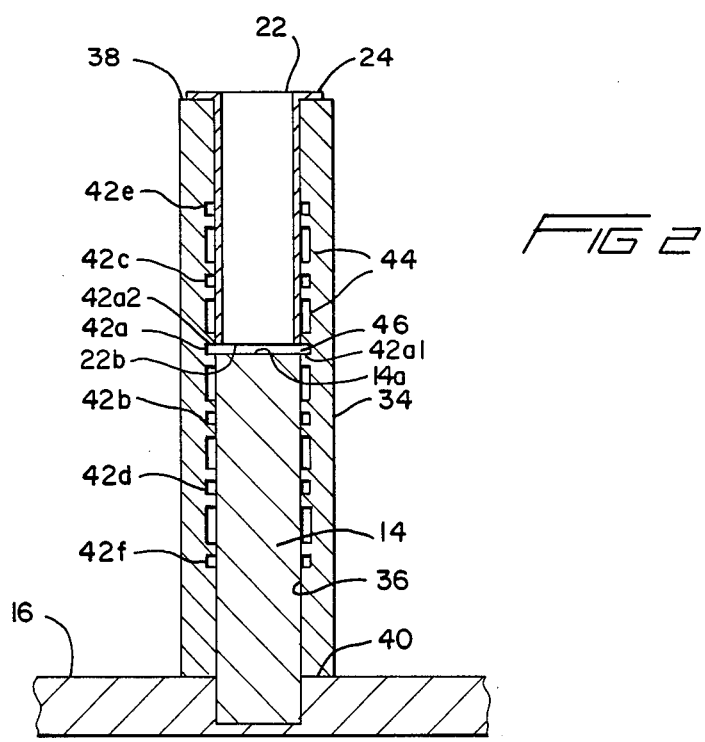
FIG. 2 shows a portion of the apparatus of FIG. 1 with a valve body.

FIG. 2 shows a portion of the apparatus of FIG. 1 with a valve body 34. This valve body 34 is typically of pneumatic valves, for instance. The valve body 34 has a bore 36 in which a valve stem (not shown) slides. The bore 36 extends through the valve body 34, from a top end 38 to a bottom end 40. The bore 36 includes recess-like annular grooves 42a through 42f. Six annular grooves are shown as an example. New O-rings are inserted into these annular grooves with the apparatus according to this invention. The bore 36 has other recess-like internal air passages 44. Five air passages 44 are shown, as an example. These air passages 44 lead to pneumatic power supplies and equipment that is operated by such power supplies. The valve body 34 is placed on the base 16 with the plug 14 positioned into the bore 36 from the bottom end 40 of the valve body 34. Thus, the valve body 34 is held by the base 16 and plug 14 during O-ring insertion. A separate device for holding the valve body is not needed. The plug 14 is positioned just below the annular groove 42a in this example, i.e., with its supporting surface 14a to an edge $42a_1$ of the groove 42a. The tube 22 is placed in the top end 38 of the bore 36 until the flange 24 rests on the valve body 34. The bottom of the tube 22 defines a front surface 22b which is positioned just above the annular groove 42a, i.e., adjacent to an edge $42a_2$ of the groove 42a. The lengths of the plug 14 and the tube 22 are chosen so a gap 46 exists between them when both are inserted in the bore 36. These lengths are also chosen so the gap 46 is adjacent the annular groove 42a. The valve body 34, as assembled with the apparatus of this invention, is now ready for insertion of an O-ring.

FIG. 3 shows an O-ring 48 as initially inserted into the tube 22. The O-ring 48 is folded over, in a double-u shape, before it is inserted into the top of the tube 22. Folded this way, the O-ring's tendency to bind against the interior 22a of the tube 22 is minimized. The tube 22 guides the O-ring 48 past other recesses like annular grooves 42c and 42e and air passages 44, which are blocked by the tube 22. The plug 14 and the tube 22 insure that the O-ring 48 is inserted in a selected annular groove, such as 42a.

FIG. 4 shows the probe 26 urging the O-ring down through the tube 22 toward the annular groove 42a. The probe 26 is held with its wide end 28 down. The wide end 28 engages the lowest portions 48a (one portion shown) of the folded O-ring 48. Thus, when the probe 26 is pushed downward, portions 48a precede the rest of the O-ring 48 in descending the tube 22. In this way, the O-ring 48 cannot roll over itself and bind, which is common with O-rings that are inserted flat. The O-ring 48 is pushed downward with probe 26 until the portions 48a are stopped by the supporting surface 14a of the plug 14, and remaining portions 48b of the O-ring rest against the interior 22a of the tube 22.

FIG. 5 shows the insertion of the O-ring 48 into the annular groove 42a. The probe 26 is inverted, and held with the narrow end 30 down. The probe 26 is moved so the notch 32 engages and urges downward the remaining portions 48b of the O-ring 48. The O-ring 48 is snapped into place within the annular groove 42a. The probe 26 and the tube 22 are removed from the bore 36. The valve body is then lifted from the plug 14, with the O-ring 48 in place.

O-rings or seals can also be placed in annular grooves 42b through 42f using the apparatus of FIG. 1. After withdrawing the probe 26 and the tube 22 from the bore 36, the valve body 34 is inverted so the plug 14 is positioned through the end 38. The tube 22 is then inserted through the end 40 of the inverted valve body 34. The gap 46 is now adjacent the annular groove 42b, because the valve body is symmetric about its length. Another O-ring 48 is inserted in the annular groove 42b in the manner discussed above. An O-ring is placed in the annular grooves 42c and 42d using the mid-length plug 12 and the short tube 18 of FIG. 1. The valve body 34 is placed over the plug 12 with end 40 down, for insertion of an O-ring into the annular groove 42c, for instance. The valve body 34 is then inveted so an O-ring can be inserted into the annular groove 42d. A tube similar to tubes 18 and 22 is not needed to guide an O-ring into the annular grooves 42e and 42f. The bore 36 guides the O-ring as the O-ring is pushed by the probe 26 toward these annular grooves 42e and 42f.

Other modifications are apparent to those skilled in the art which do not depart from the scope of the invention, as defined by the claims. For instance the probe 26 can have a generally conical shape. The sizes of the plugs 10, 12, and 14 and the tubes 18 and 22 can be varied to fit different valve bodies. The plugs 10, 12 and 14 can be cylinders with small bores, if enough top surface exists to support a seal or O-ring during insertion. The apparatus also can be used to insert seals in actuators, for instance.

What is claimed is:

1. An apparatus for inserting seals into a body, the body having a bore which extends through the body and defines an opening in the body at each end of the bore, and at least one annular groove situated within the bore between said ends and in said body for receiving a seal, said annular groove defining parallel spaced apart edges, the apparatus comprising:

a cylindrical plug having a seal supporting surface at one end and an outside diameter which is substantially equal to the inside diameter of said bore and such that the cylindrical plug can be inserted through one end of said body into said bore to a position where said seal supporting surface is located adjacent to on edge of an annular groove;

a seal insertion tube having a front surface, an inside diameter defining a seal passage and an outside diameter substantially equal to the inside diameter of said bore and such that the seal insertion tube can be inserted through the other end of said body into said bore to a position where said front surface is located adjacent to the other edge of said annular groove; and means for urging a seal through the inside diameter of said seal insertion tube against said seal supporting surface of said cylindrical plug and thereafter for urging the seal into said annular groove.

2. The apparatus as defined in claim 1, wherein:

said seal insertion tube further has a flange at its end opposite to its front surface which engages said body at said other end of said body when the seal insertion tube is inserted through said other end of said body thereby limiting the insertion of said seal insertion tube so that said front surface is located adjacent to the other edge of said annular groove.

3. The apparatus as defined in claim 1, further comprising:

a plate to which said cylindrical plug is mounted at its end opposite to its seal supporting surface, said plate engaging said body when the cylindrical plug is inserted through said one end of said body thereby limiting the insertion of said cylindrical plug so that said seal supporting surface is located adjacent to said one edge of said annular groove.

4. The apparatus as defined in claim 3, wherein:

said seal insertion tube further has a flange at its end opposite to its front surface which engages said body at said other end of said body when the seal insertion tube is inserted through said other end of said body thereby limiting the insertion of said seal insertion tube so that said front surface is located adjacent to the other edge of said annular groove.

5. The apparatus as defined in claim 1, wherein:

said means for urging comprises an elongated probe having unequal widths at its ends, with the narrow width end further defining a seal engaging notch.

6. The apparatus as defined in claim 1 wherein the body includes a plurality of annular grooves, said apparatus further comprising:

a plurality of cylindrical plugs equal in number to the plurality of annular grooves;

a plurality of seal insertion tubes equal in number to the plurality of annular grooves; and a plate to which each cylindrical plug is mounted at its end opposite to its seal supporting surface, further wherein:

each cylindrical plug is associated with a respective seal insertion tube, and each associated cylindrical plug and seal insertion tube is correspondingly associated with an annular groove.

7. The apparatus as defined in claim 6, further wherein:

said plate engages said body when a cylindrical plug is inserted through said one end of said body thereby limiting the insertion of said cylindrical plug so that its seal supporting surface is located adjacent to one edge of said associated annular groove; and each seal insertion tube further has a flange at its end opposite to its front surface which engages said body at said other end of said body when said seal insertion tube is inserted through said other end of said body thereby limiting the insertion of said seal insertion tube so that its front surface is located adjacent to the other edge of said associated annular groove.

8. The apparatus as defined in claim 6, further wherein:

said means for urging comprises an elongated probe having unequal widths at its ends, with the narrow width end further defining a seal engaging notch.

* * * * *